(No Model.)
O. THUM.
HOSE CLAMP.
No. 429,979. Patented June 10, 1890.
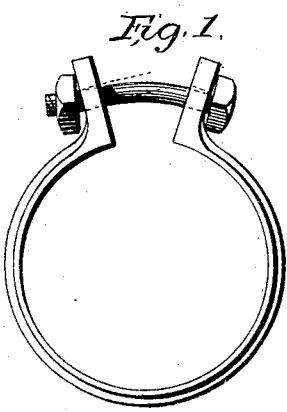
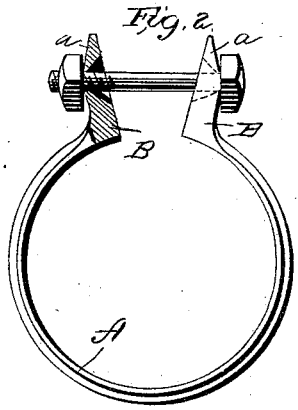
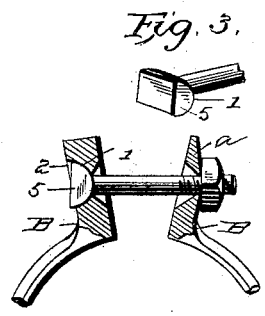
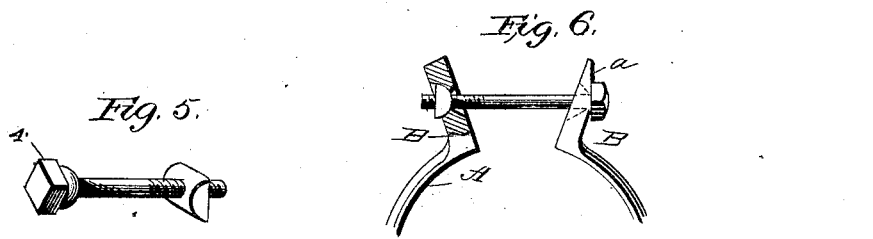
Attest
Walter Donaldson
James McPhiar
Inventor
Otto Thum
By Ellis Spear
Atty.

UNITED STATES PATENT OFFICE.

OTTO THUM, OF GRAND RAPIDS, MICHIGAN.

HOSE-CLAMP.

SPECIFICATION forming part of Letters Patent No. 429,979, dated June 10, 1890.

Application filed February 15, 1889. Serial No. 299,961. (No model.)

*To all whom it may concern:*

Be it known that I, OTTO THUM, of Grand Rapids, in the county of Kent and State of Michigan, have invented a new and useful Improvement in Hose-Clamps; and I do hereby declare that the following is a full, clear, and exact description of the same.

My invention is an improvement upon Letters Patent heretofore granted me and numbered 396,625. In that patent is shown a clamp having parallel lugs connected by means of a bolt; and my object is to adapt the ring shown therein to hose-pipes of different diameters, so as to enable a straight bolt to connect the lugs without strain upon the bolt.

In the drawings, Figure 1 represents the ordinary form of ring as applied to a pipe of larger diameter than itself. Fig. 2 is a similar view of the improved ring. Fig. 3 shows a modified form of bolt as applied to the improved form of ring, and Figs. 4, 5, and 6 also represent modifications of the bolt and nut.

In the drawings, referring to Figs. 2 to 6, A is the ring, and B B' the lugs on the ends thereof. The lugs project from the ring on radial lines, and when the clamp is applied to a hose of larger diameter than the ring the lugs will stand at an angle to each other, thus necessitating the displacement of the lugs in relation to each other before the bolt can be passed through both openings. When the ring is applied to a hose of large diameter, it will be seen that the lugs will stand at an angle to each other on radial lines, and in this position the corners of the lugs will interfere with the turning up of the nut engaging the threaded end of the bolt; and I avoid this difficulty and at the same time provide more of a bearing-surface for the nut and bolt-head by cutting away the outer upper corners of each lug, so as to make a bearing-surface approximately at right angles to the line of the bolt.

In Fig. 3 a modified form of bolt-head and bearing is shown, consisting of the rounded inner surface 1 and the straight-fitting sides 5, fitting a corresponding socket 2 in its lug. The bolt is held from turning when the nut is being run upon the threads by the side walls of the socket acting against the head; but the necessary scope is provided for the pivotal movement of the bolt to suit various sizes of hose, the head turning in the socket on its rounded surface to allow the bolt to swing either toward or from the hose, as the case may be, the hole being flaring for this purpose, as at 3.

In Figs. 4, 5 and 6 the nut is made in form similar to the head shown in Fig. 3, and is adapted to a similar socket. In each of these instances, however, the bolt-head is different, in Fig. 4 being semi-spherical to fit a similar socket and provided with a groove to receive a screw-driver, in Fig. 5 being semi-spherical and having a squared portion 4 for a wrench, and in Fig. 6 the head is of ordinary form and adapted to rest against the outer beveled surface of the lug.

I claim as my invention—

1. A hose-clamp consisting of a clamping-ring having lugs extending from its periphery, openings passing through said lugs, made flaring on the inner faces thereof, the outer upper corner of one of said lugs being cut away at an angle to the line of the lug, and a bolt connecting the lugs, substantially as described.

2. In combination, a clamping-ring having lugs with inwardly-flared openings, a socket in one of the lugs having a rounded bottom and straight end walls, and a head or nut of corresponding form, substantially as described.

In testimony whereof I have signed my name to this specification in the presence of two subscribing witnesses.

OTTO THUM.

Witnesses:
WILLIAM THUM,
FREDK. LOETTGERT.